US012397397B2

(12) United States Patent
Cattaneo

(10) Patent No.: US 12,397,397 B2
(45) Date of Patent: Aug. 26, 2025

(54) TOOL FOR ADJUSTING SHAPED PROFILE FEET FOR FURNITURE ITEMS

(71) Applicant: Leonardo S.r.l., Figino Serenza (IT)

(72) Inventor: Carlo Cattaneo, Figino Serenza (IT)

( * ) Notice: Subject to any disclaimer, the term of this patent is extended or adjusted under 35 U.S.C. 154(b) by 334 days.

(21) Appl. No.: 17/995,052

(22) PCT Filed: Apr. 29, 2021

(86) PCT No.: PCT/IB2021/053581
§ 371 (c)(1),
(2) Date: Sep. 29, 2022

(87) PCT Pub. No.: WO2021/229349
PCT Pub. Date: Nov. 18, 2021

(65) Prior Publication Data

US 2023/0128883 A1 Apr. 27, 2023

(30) Foreign Application Priority Data

May 11, 2020 (IT) ........................ 102020000010504
May 11, 2020 (IT) ........................ 102020000010510
Apr. 27, 2021 (IT) ........................ 202021000002198

(51) Int. Cl.
*B25B 13/08* (2006.01)
*A47B 91/02* (2006.01)
(Continued)

(52) U.S. Cl.
CPC ............ *B25B 13/08* (2013.01); *A47B 91/024* (2013.01); *B25B 13/48* (2013.01); *B25B 13/50* (2013.01)

(58) Field of Classification Search
CPC ......... B25B 13/08; B25B 13/48; B25B 13/50; B25B 13/5083; B25B 13/54; B25B 23/00; A47B 91/024; A47B 91/026
See application file for complete search history.

(56) References Cited

U.S. PATENT DOCUMENTS 6,196,090 B1 3/2001 Dumont
D793,194 S 8/2017 De Bruin
(Continued)

FOREIGN PATENT DOCUMENTS

CN 104924249 9/2015
CN 209774482 12/2019
(Continued)

OTHER PUBLICATIONS

Translation of Office Action issued by the Chinese Patent Office for sister Chinese application No. 202180027805.3 on Sep. 12, 2024.

*Primary Examiner* — C. A. Rivera
(74) *Attorney, Agent, or Firm* — Themis Law

(57) ABSTRACT

A tool for controlling a controlled element of a height adjustable foot of a furnishing item and the like includes an engagement portion and a handle coupled to the engagement portion and having two arms shaped to embrace an outer edge of the height-adjustable foot and keep the engagement portion associated laterally with the adjustable foot. The engagement portion is arranged between the two arms and includes a toothing with a toothed section that extends over a rounded area of the surface between the two arms of the handle so as to engage at least one toothing on the controlled element of the adjustable foot. The teeth of the toothed section and the teeth of the at least one toothing of the controlled element are asymmetrical and angled, enveloping, curved teeth that follow the circular shape of the controlled element.

5 Claims, 8 Drawing Sheets

(51) Int. Cl.
*B25B 13/48* (2006.01)
*B25B 13/50* (2006.01)

(56) References Cited

U.S. PATENT DOCUMENTS

| | | | | |
|---|---|---|---|---|
| 2014/0260817 | A1 | 9/2014 | Wilson | |
| 2019/0223596 | A1* | 7/2019 | De Bruin | B25B 23/0028 |

FOREIGN PATENT DOCUMENTS

| | | | | | |
|---|---|---|---|---|---|
| CN | 212429463 | U | * | 1/2021 | |
| DE | 202018105370 | | | 12/2019 | |
| DE | 202018105370 | U1 | * | 1/2020 | |
| GB | 2197234 | A | * | 5/1988 | B25B 13/04 |
| GB | 2535024 | | | 8/2016 | |
| WO | 2015053637 | | | 4/2015 | |
| WO | 2019043660 | | | 3/2019 | |

* cited by examiner

Fig. 8
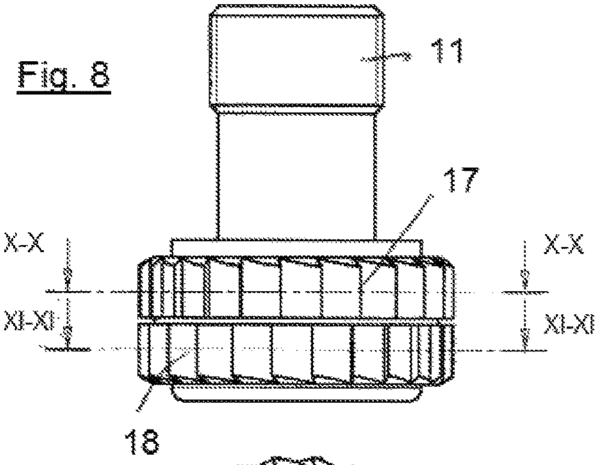
Fig. 7
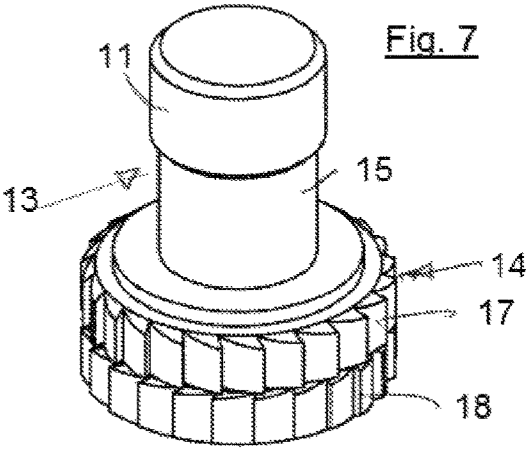
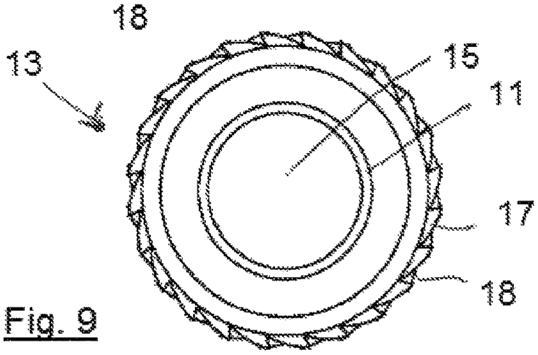
Fig. 9
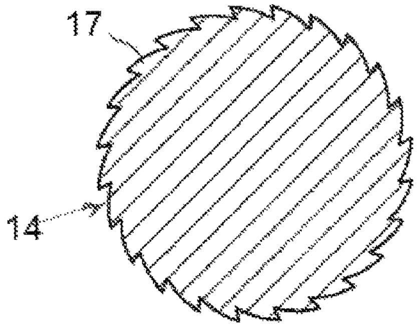
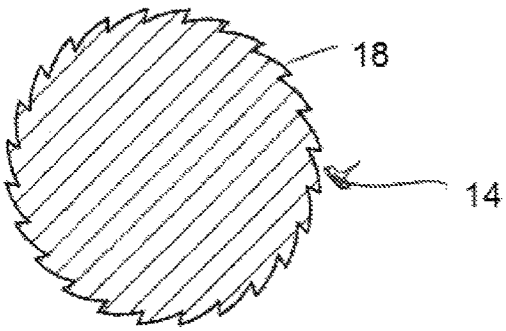
Fig. 10
Fig.11

TOOL FOR ADJUSTING SHAPED PROFILE FEET FOR FURNITURE ITEMS

The present invention relates to an improved tool for adjusting a foot with a shaped profile for furnishing items and the like.

Various types of feet can be provided, in particular adjustable feet for furniture and similar furnishing items. Adjustable feet are used, for example, provided with a variously shaped external profile, which are installed beneath the furniture and which must be adjusted by means of a front intervention by the person installing the furniture.

The external profile of the foot generally has a polygonal shape, such as square, hexagonal, etc. for facilitating the use of a complementary wrench for its adjustment.

Furniture or furnishing elements, such as kitchens, furniture, etc. must in fact be able to easily and safely reach a stable and levelled position through adjustment with these feet if they are arranged in front of the furniture, i.e. easily accessible, and also above all if they are arranged at the rear and are less easily accessible.

It has been seen that this type of adjustment is easier and more manageable to effect if achieved with the aid of a tool or wrench as indicated above. This use in fact ensures that the foot is more manoeuvrable by the user, in particular for the rear feet.

There are positions however in which access via this type of wrench is not so easy and it is difficult to insert the wrench or tool onto the profile of the foot.

For this purpose, feet have been provided which have a toothed outer profile so as to be more easily engaged by whoever has to act and intervene for their adjustment.

WO 2015/053637 relates to a furniture-levelling apparatus which comprises a handle equipped with a control end-knob which actuates a pinion positioned between two arms which become engaged on the foot. The pinion engages with a rack integral with the foot.

US 2014/0260817 relates to a wrench for applying a torque having an internal profile shaped by at least two radial extensions.

The general objective of the present invention is to provide an improved tool for adjusting feet with a shaped profile for furnishing items and the like capable of solving the above-mentioned drawbacks of the prior art in an extremely simple, economical and particularly functional way.

A further objective of the present invention is to provide a tool which ensures optimal action on the single foot.

Another objective of the present invention is also to provide a tool that is extremely simple, but which ensures a stable engagement on the single front foot and/or above all on the rear foot of the furniture or the like from any direction in which it is brought into engagement.

Yet another objective of the invention is to provide a tool for adjusting a foot, in particular of the type consisting of a profile provided with perimetral toothings.

The above objectives are achieved by an improved tool for adjusting feet with a shaped profile for furnishing items and the like produced according to independent claim 1 and the following subordinate claims.

The structural and functional characteristics of the present invention and its advantages with respect to the known art will become even more evident from the following description, referring to the attached schematic drawings, which show an embodiment example of the same invention. In the drawings.

Figure 1:
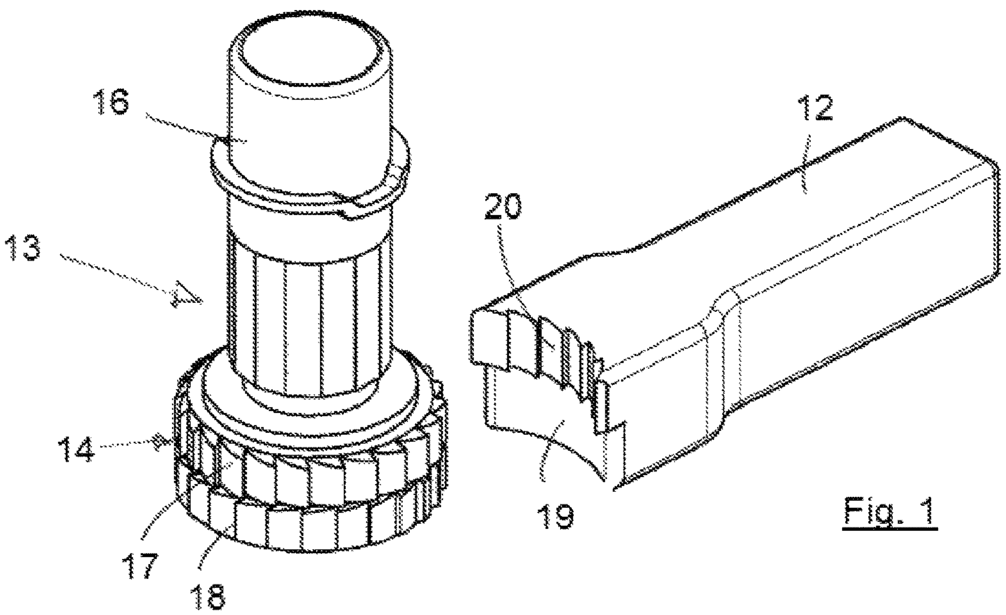
FIG. 1 is a perspective view of a first embodiment of a tool according to the invention positioned adjacent to a foot to be adjusted.
Figure 6A:
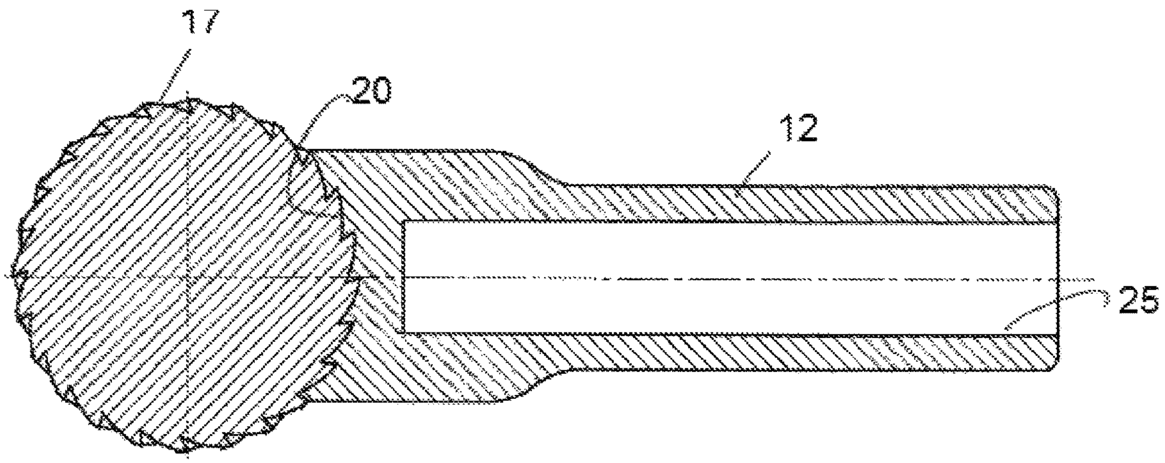
Figure 6B:
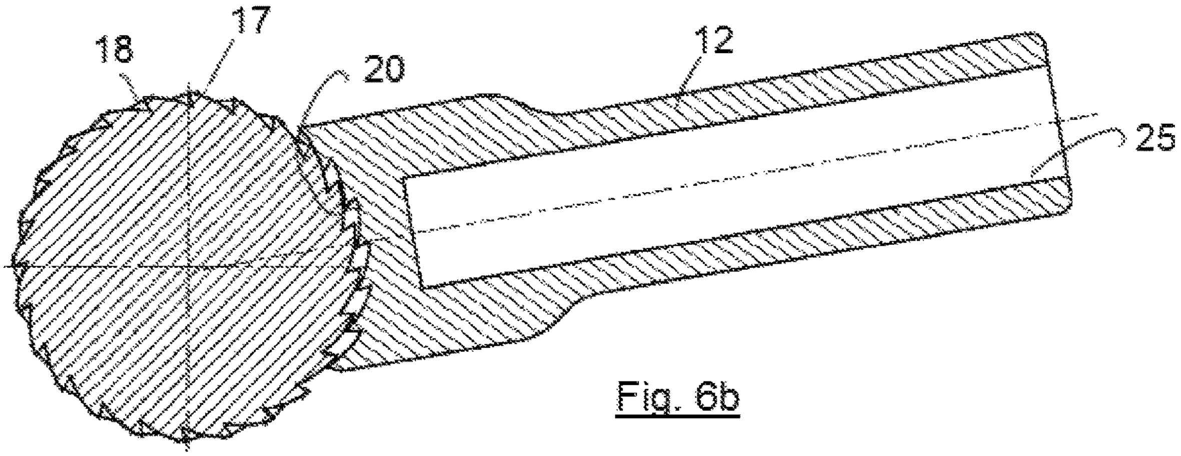
Figure 6C:
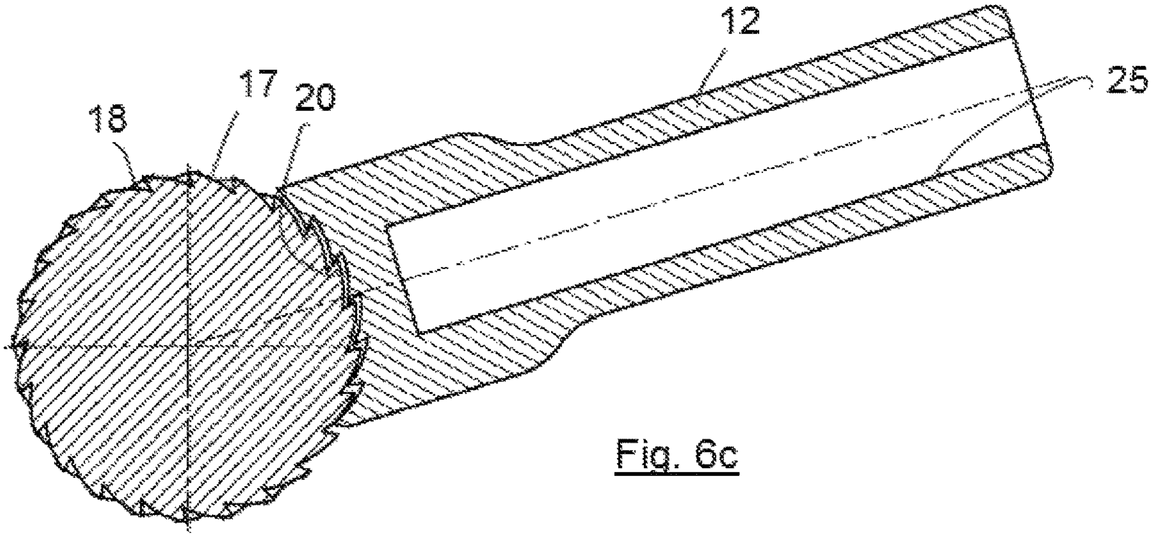
Figure 12:
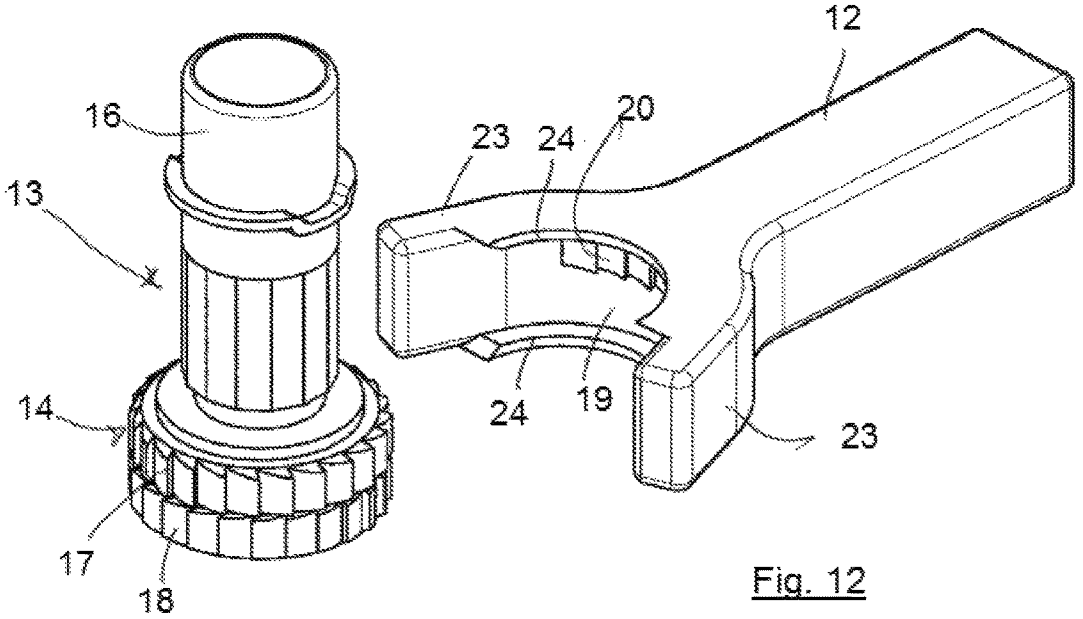
Figure 13:
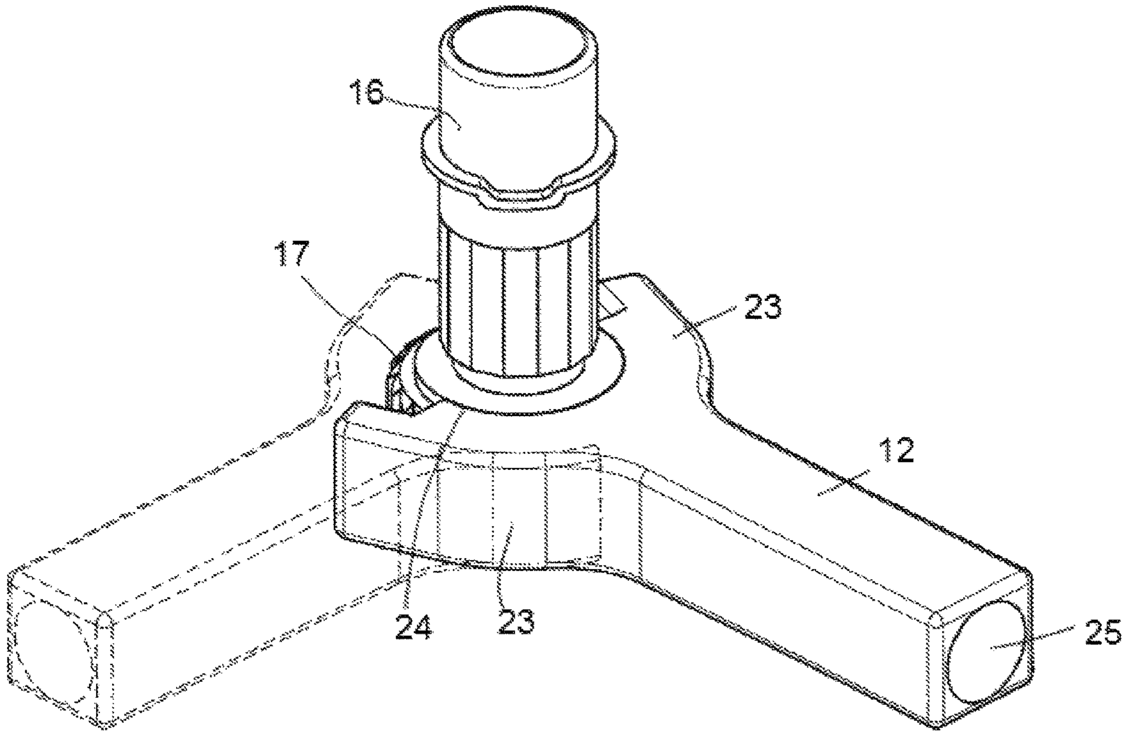
Figure 14:
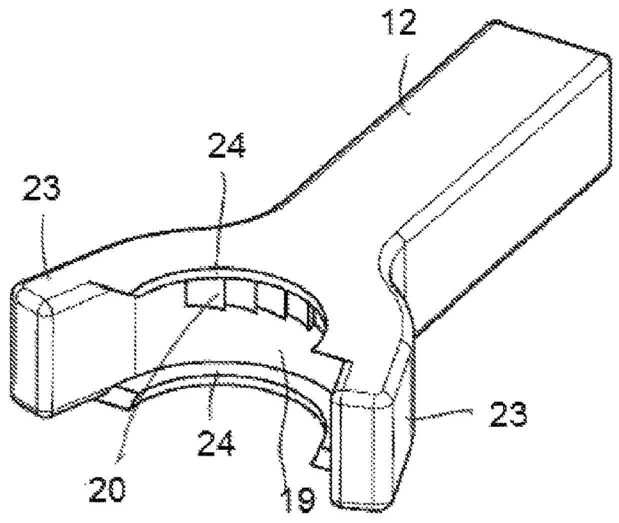
Figure 15:
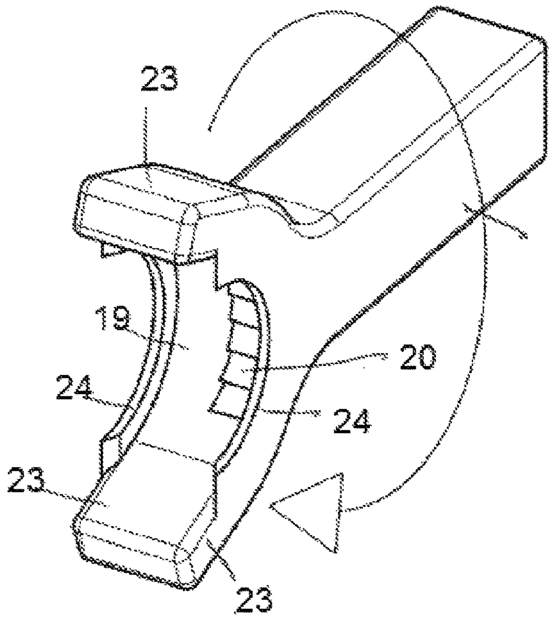
Figure 16:
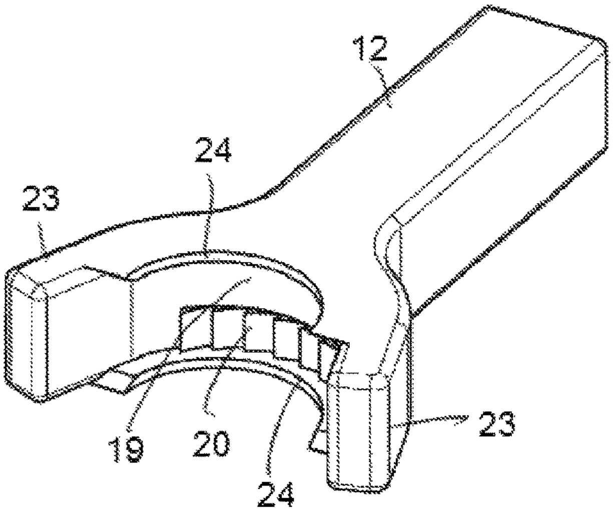
Figure 17A:
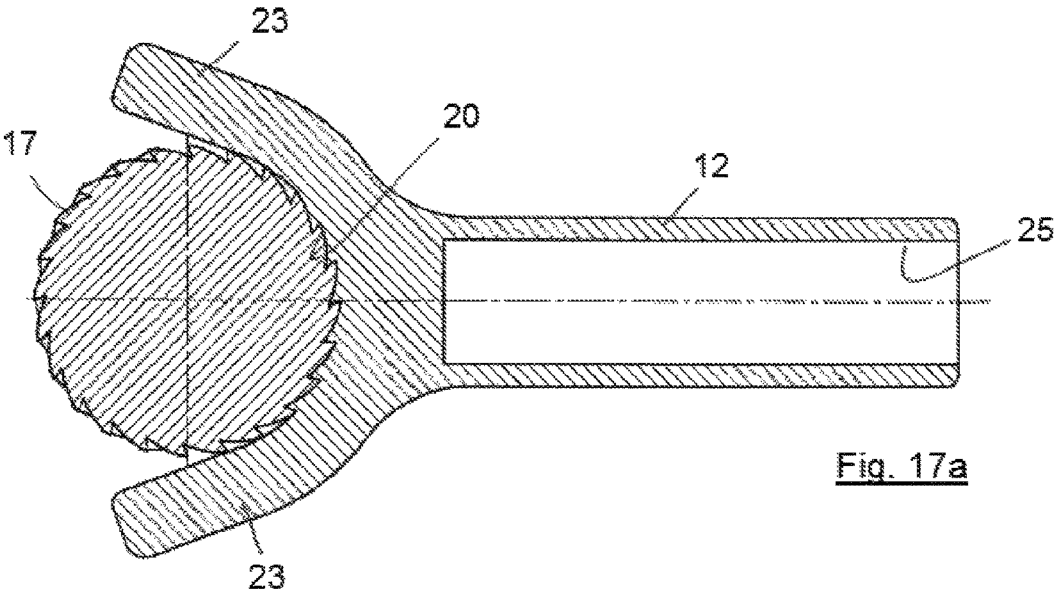
Figure 17B:
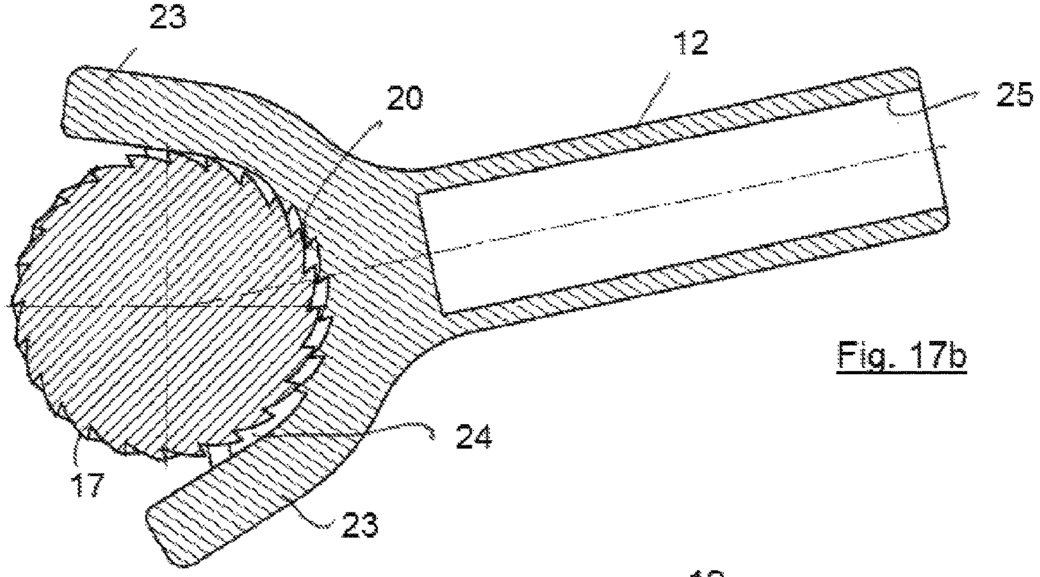
Figure 17C:
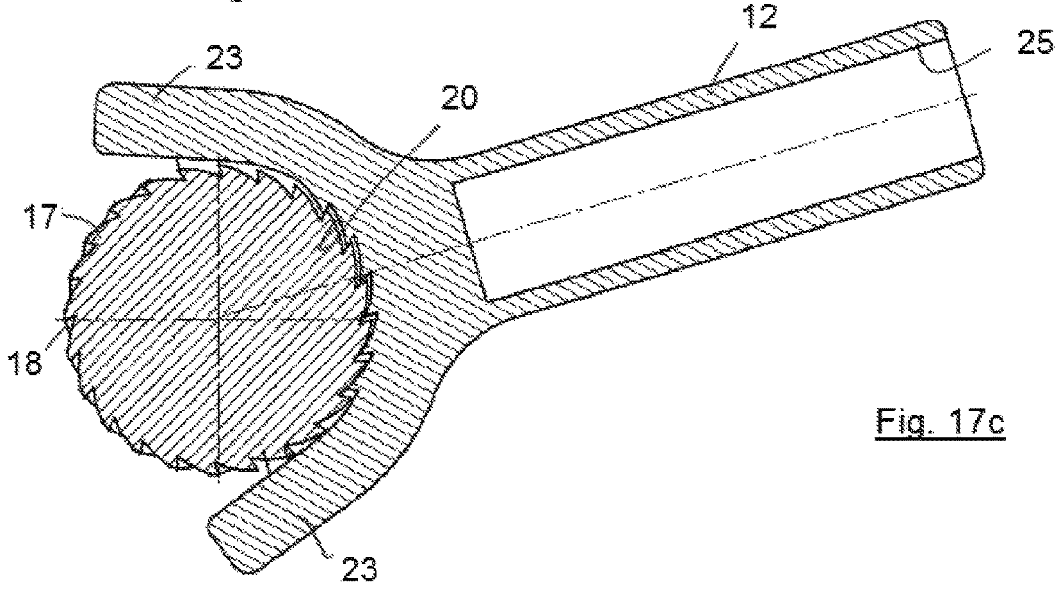

FIGS. 6*a*, 6*b* and 6*c* are sectional views from above of the tool in FIG. 1 when actuated in successive positions for its engagement on the foot;

FIGS. 7, 8 and 9 show views of the foot alone in a perspective view, a raised view and a view from above;

FIGS. 10 and 11 show sections of the foot of FIG. 8 along the lines X-X and XI-XI of the same FIG. 8;

FIG. 12 is a perspective view of a second embodiment of a tool according to the invention positioned adjacent to a foot to be adjusted;

FIG. 13 is a view from which it can be seen how the tool in FIG. 12 can be actuated for adjusting the foot;

FIGS. 14, 15 and 16 show further perspective views with different orientations of the tool of FIG. 12;

FIGS. 17*a*, 17*b* and 17*c* are sectional views from above of the tool in FIG. 7 when actuated in successive positions for engaging on the foot.

Figure 18:
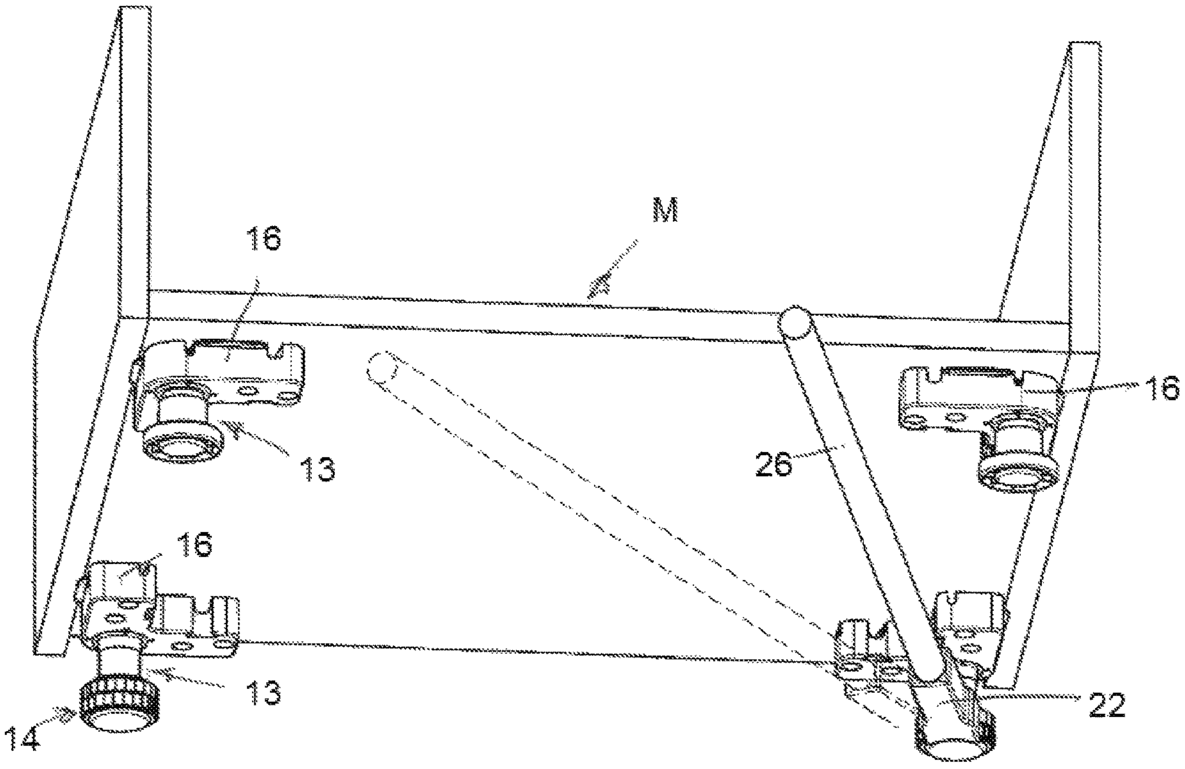

FIG. 18 shows a perspective view from below of a bottom of a piece of furniture provided with front and rear feet in which a tool according to the invention is being used for adjusting a rear foot.

With reference to the figures, which are illustrative and non-limiting, these show embodiments of an improved tool for adjusting feet with a shaped profile for furnishing items and the like according to the present invention.

In particular, FIGS. 1 to 6*c* show a first embodiment of the tool or wrench which comprises a handle 12 provided in correspondence with one of its free ends with engagement and control means acting on a height-adjustable foot 13. In particular, the adjustable foot 13 provides a supporting part 14 from which a stem 15 extends, at least partly threaded in 11, suitable for being inserted, screwable and unscrewable, in a cylindrical body 16 or having another suitable form, internally threaded, which can be coupled with a piece of furniture or a part thereof M.

The supporting part 14 of the foot 13 constitutes a controlled element of the foot 13 and appears in the example as an area having an essentially circular adjustable section provided with an outer profile equipped with a series of toothings 17, 18 as can be better seen in FIGS. 7 to 11. In particular, the example shows how in this area of the adjustable foot there are two series of toothings 17, 18 superimposed and opposed to each other in the direction obtained around the supporting part 14 of the foot 13. The toothings have curved and enveloping teeth which follow the circular trend of the supporting part.

These toothings have asymmetrical and angled teeth.

Said toothings are composed of teeth similar to those of a saw-toothed wheel tilted in an opposite direction with respect to each other.

This tool provides that at the end of the handle 12 there is a rounded shaped area 19, which facilitates the coupling with the supporting part 14 of the foot 13, where the above-mentioned engagement means are arranged. In particular, this rounded shaped area 19 provides a profile similar to the outer profile of the supporting part 14 of the foot 13, i.e. the toothings 17 or 18. As already mentioned, the above-mentioned engagement or control means are arranged on the adjustable foot 13 associated with said rounded shaped area 19 of the end of the tool. Said engagement or control means, which are associated laterally with respect to the foot 13, are composed of at least one toothing 20 complementary to at least one of the toothings 17, 18 of the profile of the supporting part 14 of the foot 13 with which it is coupled.

In the example shown, said toothing 20 consists of a toothed section distributed over a surface parallel to and protruding from the underlying similarly rounded, but smooth, shaped area 19 of the free end of the handle 12. As already indicated, the toothing 20 can be coupled with a section of the at least one toothing 17, 18 formed peripherally on the supporting part 14 of the adjustable foot 13.

Figure 3:
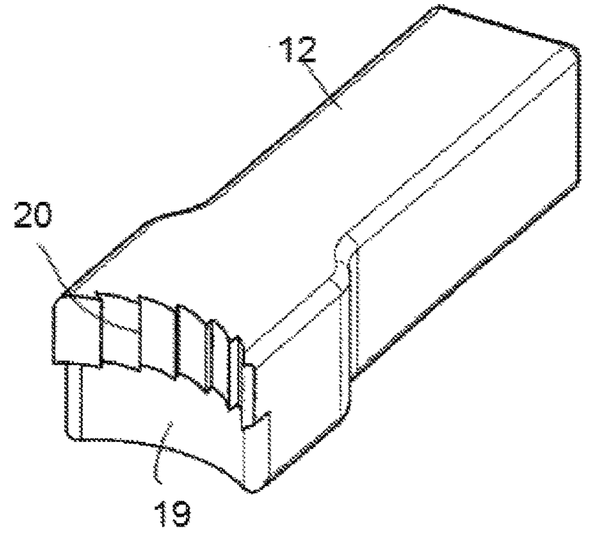
FIGS. 3, 4 and 5 show further perspective views with different orientations of the tool of FIG. 1.
Figure 4:
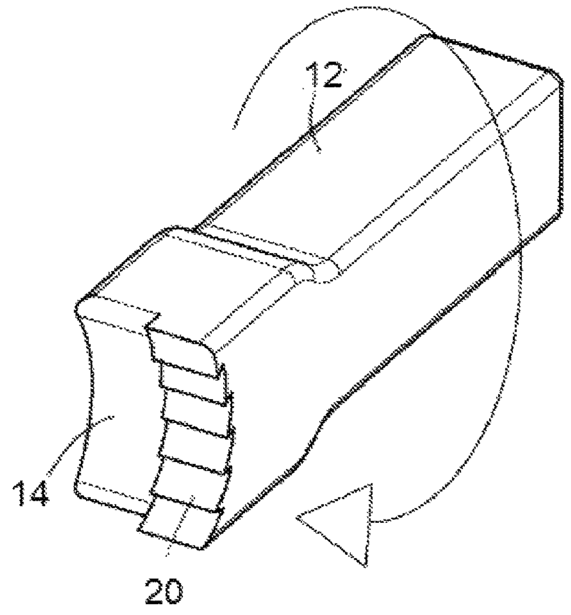
Figure 5:
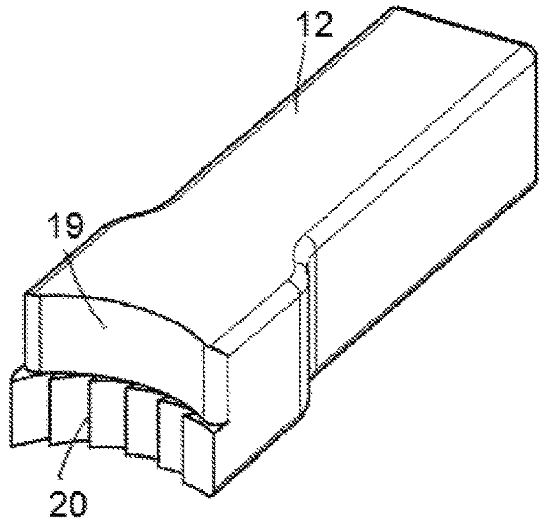

In this way, it can be noted how, by rotating the tool as shown in FIGS. 3, 4 and 5, a position is in any case obtained, which is useful for creating an engagement of the toothing 20 of the tool with at least one of the two toothings 17 or 18 provided on the supporting part 14 of the foot 13. Consequently, depending on the supporting part 14 of the adjustable foot 13 to be manoeuvred 17 or 18, it is possible to choose whether to keep the tool or wrench with the toothed part or toothing 20 upwards or downwards.

It can thus be seen that the controlled element 14 and the tool equipped with its engagement means for controlling the controlled element 14 of a height-adjustable foot 13 constitute an apparatus for adjusting a height-adjustable foot of a piece of furniture M and the like.

Figure 2:
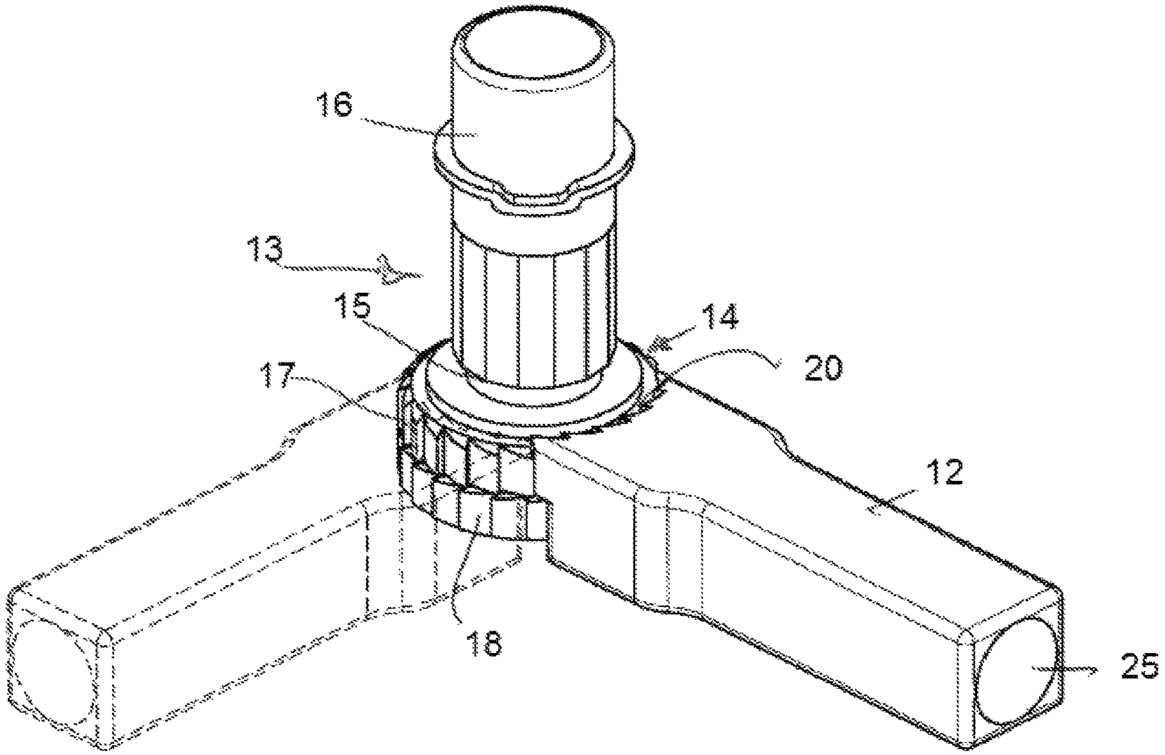
FIG. 2 is a view from which it can be seen how the tool in FIG. 1 can be actuated for adjusting the foot.

FIG. 2 shows how the foot is adjusted by rotating the tool from one position to another, keeping it close to and engaged on the foot, in this case by acting with the tool of the invention on the toothing 17 of the adjustable part.

Identically, FIGS. 6*a*, 6*b* and 6*c* are cross-sectional views which show how the end part of the tool provided with a toothing 20 becomes engaged with one of the toothings 17 or 18 of the foot however they may be directed in their two opposite directions.

It can also be noted how the rounded shape of the end of the tool collaborates with a correct engagement between the above-mentioned teeth of the tool and the foot. All of this being effected with extreme ease for creating a secure engagement.

Furthermore, the provision shown of two opposing toothings 17, 18 on the supporting part of the foot causes said engagement or coupling between the parts to be effected in any direction in which the tool rotates or is facing the foot 14.

FIGS. 12 to 17*c* show a second embodiment of the tool in which the same elements have the same reference numbers.

It can be noted that in this example, the tool or wrench of the invention provides that the handle 12 forms part of a fork-shaped body 22. The fork-shaped body 22 provides two arms 23 that envelop the supporting part 14 of the foot 13. In addition to these essential elements, the example shown provides that the two arms 23 have edges 24 protruding towards the inside of the same which define housing and centering seats for peripheral parts of the supporting part 14 of the foot 13.

Here again it is useless to repeat that the engagement means on the adjustable foot 13 consist of a toothing 20 complementary to at least one of the toothings 17, 18 of the profile of the supporting part 14 of the foot 13.

And here again the toothing 20 consists of a toothed section distributed over a surface parallel to and protruding from an underlying similarly rounded, but smooth, area 19, of the gripping part 12 between the two arms 23. In FIG. 12 the toothing 20 is shown above the smooth rounded area 19.

FIG. 13 also illustrates how the tool can acquire different positions so as to be rotated easily and from different actuation positions, after its engagement on the supporting part of the foot 13. This also takes place thanks to the presence of the protruding edges 24 provided on arms 23 which engage on the supporting part 14 of the foot 13. As shown in the figures, the two arms 23 preferably diverge and widen outwardly to embrace the supporting part 14 of the foot 13.

FIGS. 14, 15 and 16 show how, by rotating the tool, a useful position is in any case obtained for forming a coupling of the toothing 20 of the tool with at least one of the two toothings 17 or 18 provided on the supporting part 14 of the foot 13. And this takes place as, on the basis of the part 17 or 18 of the supporting part 14 of the adjustable foot 13 to be manoeuvred, it is possible to choose whether to hold the tool or wrench with the toothed part or toothing 20 upwards or downwards.

FIGS. 17*a*, 17*b* and 17*c* show the actuation phase with this tool even more clearly, or how the tool can be disengaged and re-engaged with respect to the toothings 17, 18 provided by the foot 13.

It should be noted that in the body of the tool or rather in its handle 12, as shown in both examples, a blind hole 25 is provided, formed in an axial position with respect to the handle 12 for receiving a rod 26 for actuating the tool which allows easier use. It is in fact possible to intervene even beneath the bottom of a piece of furniture M as shown in FIG. 18, thanks to this rod 26 by maneuvering from the outside of the furniture. The rod 26 also allows a greater torque to be applied by facilitating the rotation of the single foot 14 even in the presence of strong friction or heavy furniture that hinders this rotation. It is therefore possible to adjust the feet from the front of the furniture frontally thanks to the use of a tool or wrench according to the present invention.

It can therefore be noted that this specific tool according to the invention allows the easy adjustment of a supporting foot or leg such as that on a piece of furniture or other furnishing item which provides this type of foot, by adjusting the foot or supporting leg in order to correct its level.

It is also evident that this specific tool is engaged with the movable or rotating part of the foot in order to allow adjustment, even if this part is difficult to reach and if a significant force must be applied to it due to the weight of the furniture.

The objective mentioned in the preamble of the description has thus been achieved.

The protection scope of the present invention is defined by the enclosed claims.

The invention claimed is:

1. An apparatus for adjusting a height-adjustable foot of a piece of furniture, comprising:

a controlled element of the height-adjustable foot, the controlled element extending into a stem, at least partly threaded and configured to be inserted, screwable and unscrewable, into a cylindrical body which is internally threaded, and which can be coupled with the piece of furniture; and a tool for controlling said controlled element of the height-adjustable foot;

the tool comprising:

an engagement portion and a handle for rotating said engagement portion, two arms extending from said handle, said two arms embracing a diametric edge of said height-adjustable foot to keep the tool and the engagement portion associated laterally with the height-adjustable foot, said engagement portion being arranged between said two arms, which face each other, and becoming engaged with said controlled element for rotating said height-adjustable foot, wherein said engagement portion comprises a toothing having a toothed section which extends distributed over a rounded area of a surface between said two arms of said handle and which engages with at least one toothing formed peripherally on said controlled element of said height-adjustable foot, wherein teeth of said toothed section and teeth of said at least one toothing of said controlled element are asymmetrical and angled, enveloping, curved teeth that follow a circular configuration of said controlled element, wherein said controlled element of said height-adjustable foot comprises two superimposed toothing rows, wherein the teeth of the two superimposed toothing rows are teeth of a saw-toothed wheel, the teeth of the two superimposed toothing rows being tilted in an opposite direction with respect to each other, and wherein the rounded area of the surface between the two arms of the handle comprises the toothed section and a smooth section parallel thereto, the toothed section being superimposed on the smooth section, whereby the toothed section is positioned to engage at least a portion of a first one of the two superimposed toothing rows of the saw-toothed wheel, the smooth section preventing an engagement of the tool with a second one of the two superimposed toothing rows of the saw-toothed wheel, and whereby, by turning the tool upside down, the toothed section is positioned to engage the second one of the two superimposed toothing rows of the saw-toothed wheel, the smooth section preventing an engagement of the tool with the first one of the two superimposed toothing rows of the saw-toothed wheel.

2. The apparatus according to claim 1, wherein said two arms of said tool have edges protruding towards an inside of the tool and define housing and centering seats for at least one peripheral part of a supporting part of said controlled element of the height-adjustable foot.

3. The apparatus according to claim 1, wherein said rounded area of the surface between said two arms of said tool is complementary in shape to an external shape of said controlled element of the height-adjustable foot.

4. The apparatus according to claim 1, wherein said two arms of said tool diverge from said handle.

5. The apparatus according to claim 1, wherein the engagement portion further comprises upper and lower edges protruding toward an inside of the engagement portion beyond the toothed section so as to abut against edges of the height-adjustable foot arranged above and respectively below the two superimposed toothing rows.

* * * * *